United States Patent
Sekita et al.

[11] Patent Number: 5,918,692
[45] Date of Patent: Jul. 6, 1999

[54] SMALL-SIZED VEHICLE

[75] Inventors: Takahito Sekita; Masao Ogawa; Yutaka Murata, all of Saitama, Japan

[73] Assignee: Honda Giken Kogyo Kabushiki Kaisha, Tokyo, Japan

[21] Appl. No.: 08/838,042

[22] Filed: Apr. 22, 1997

[30] Foreign Application Priority Data

Apr. 22, 1996  [JP]  Japan .................................. 8-135642

[51] Int. Cl.[6] .............. B60K 1/00; B60G 3/14; B60G 9/02; B62D 21/11
[52] U.S. Cl. .................. 180/56; 180/65.1; 180/68.5; 180/908; 280/781; 280/788; 280/124.116; 280/124.128
[58] Field of Search .................. 280/788, 781, 280/783, 690, 697, 698, 701, 691, 692, 693, 696, 713, 724, 725, 663, 666, 124.116, 124.128, 124.156, 124.165, 124.179; 180/216, 55, 56, 59, 60, 62, 65.1, 68.5, 312, 908

[56] References Cited

U.S. PATENT DOCUMENTS

| | | | |
|---|---|---|---|
| 1,138,181 | 5/1915 | Bock | 280/724 |
| 1,803,055 | 4/1931 | Causan | 280/788 |
| 2,499,495 | 3/1950 | Gregory | 280/788 |
| 3,477,538 | 11/1969 | Hall et al. | 180/65.1 |
| 3,785,672 | 1/1974 | Shakespear . | |
| 4,339,015 | 7/1982 | Fowkes et al. | 180/68.5 |
| 4,425,976 | 1/1984 | Kimura | 180/56 |
| 4,629,023 | 12/1986 | Carpanelli et al. | 280/701 |
| 4,641,854 | 2/1987 | Masuda et al. | 280/701 |
| 4,830,396 | 5/1989 | Gandiglio | 280/788 |
| 5,501,289 | 3/1996 | Nishikawa et al. . | |

FOREIGN PATENT DOCUMENTS

| | | |
|---|---|---|
| 998406 | 1/1952 | France . |
| 2684606 | 6/1993 | France . |
| 59-190058 | 10/1984 | Japan . |
| 655480 | 7/1951 | United Kingdom . |
| 831684 | 3/1960 | United Kingdom . |
| 948862 | 2/1964 | United Kingdom . |
| 969703 | 9/1964 | United Kingdom . |

OTHER PUBLICATIONS

Patent Abstract of Japan, No. 05201356, Oct. 10, 1993.
Patent Abstract of Japan, No. 59190058, Oct. 27, 1984.
Patent Abstract of Japan, No. 07156826, Jun. 20, 1995.

*Primary Examiner*—Peter C. English
*Attorney, Agent, or Firm*—Birch, Stewart, Kolasch & Birch, LLP

[57] ABSTRACT

A vehicle frame is to be made compact. A rectangular frame portion includes a vehicle body frame having front wheels supported thereon through leading arms and rear wheels supported thereon through trailing arms. Both front and rear wheels are suspended by front and rear shock absorbers. The heights of pivot points are set almost equal to the heights of the rectangular frame portion. A battery is accommodated in the space defined by the rectangular frame portion and the rear portion of the vehicle body is extended to overhang a swing power unit assembly.

14 Claims, 5 Drawing Sheets

SMALL-SIZED VEHICLE

BACKGROUND OF THE INVENTION

1. Field of the Invention

The present invention relates to a small-sized one-passenger or two-passenger vehicle suitable for operating on city streets.

2. Description of Background Art

In Japanese Patent Laid-Open No. Sho 59-190058 a small-sized vehicle is disclosed wherein a pipe frame having a floor portion and a stepped rear portion which is higher than the floor portion is provided. A vehicle body having a bottom shape conforming to the pipe frame is positioned on the pipe frame. A power unit is disposed in the rear stepped portion.

In the above conventional example, since rear shock absorbers are supported above the rear wheels, a sufficient strength is required up to the rear shock absorber supporting points, resulting in the vehicle body frame being larger in both size and weight. Further, due to various limitations in layout such as limitations in the amount of shock absorber stroke, shape of the power unit and the amount of seat slide, the vehicle body frame is complicated and the cost is increased.

SUMMARY AND OBJECTS OF THE INVENTION

To solve the above problem, according to the present invention, there is provided a small-sized vehicle wherein a vehicle body frame for supporting the body of the vehicle is constituted in a quadrilateral shape to include front, rear, right and left members. Front and rear wheels are supported in the front and in the rear of said vehicle body frame by means of arm members extending forwardly and rearwardly, respectively. The arm members are suspended from the vehicle body frame through shock absorbers, and the vehicle body is fixed on the vehicle body frame. The arm members and the shock absorbers are supported by pivot portions disposed at approximately the same height as the height of the vehicle body frame in the vertical direction.

The small-sized vehicle may be an electric vehicle with a battery provided for power being accommodated in the space defined by the quadrilateral portion of said vehicle body frame.

The height of the pivot portions of the front arm members and that of the lower end portion of a battery may be approximately the same.

A power unit may be disposed on the rear arm members. The vehicle body may be made of a resin with a portion extending above said power unit. The vehicle body may be fixed onto said vehicle body frame.

Since arm members and shock absorbers are supported by pivot portions provided at approximately the same height as the height of the vehicle body frame in the vertical direction, the front and rear wheels can be respectively suspended by the front and rear ends of the body frame formed in a quadrilateral shape. Consequently, it is not required to extend the vehicle body frame up to above the front and rear wheels, so that the vehicle body frame becomes smaller in both size and weight.

Besides, since there are no longer any limitations in the amount of the shock absorber stroke, the shape of the power unit and the amount of the seat slide, the structure of the vehicle body frame is simplified and the cost is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
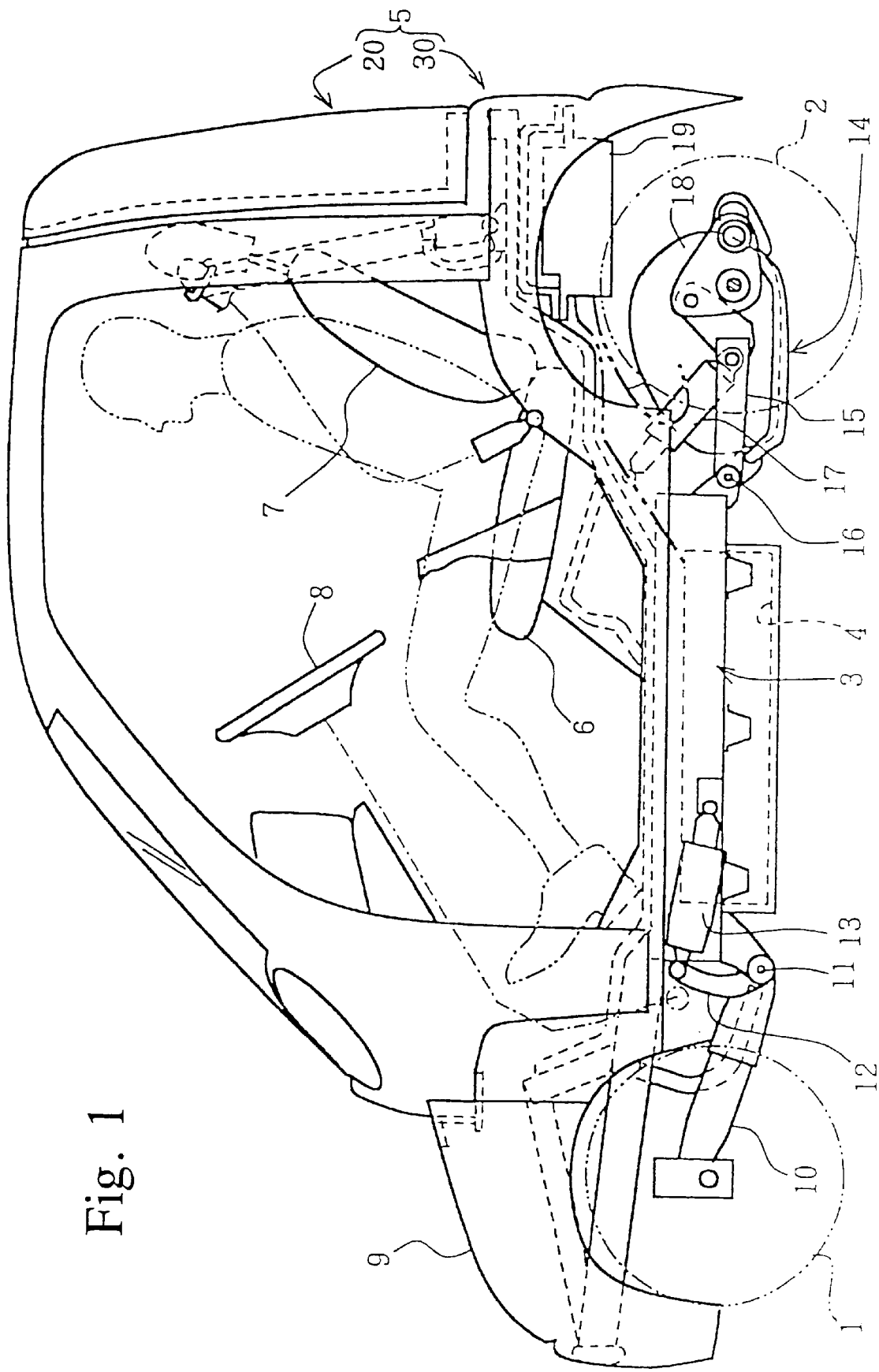
FIG. 1 is a side elevational view of a small-sized vehicle with the frame member being illustrated in broken lines.

In the small-sized vehicle shown in FIG. 1, a battery 4 is supported by a vehicle body frame 3 disposed between a pair of right and left front wheels 1 and a pair of right and left rear wheels 2, and a vehicle body 5 which constitutes a passenger compartment is supported on the vehicle body frame 3, the vehicle body 5 having an integral structure of upper and lower portions.

Large openings are formed in the right and left side faces of the vehicle body 5. A passenger compartment is formed inside of the vehicle body. A seat cushion 6 and a seat back 7 are provided in the passenger compartment. A steering wheel 8 is mounted adjacent to the seat. The front portion of the vehicle body 5 is covered with a detachable front fender 9.

The front wheels 1 are supported in front of the vehicle body frame through a pair of right and left leading arms 10 pivotably mounted about pivot points 11.

Front arms 12 project integrally upwardly from positions close to the pivot points 11 of the leading arms 10. The front shock absorbers 13 are mounted between the front arms 12 and the side faces of the vehicle body frame 3.

The rear wheels 2 are supported by the rear portion of the vehicle body frame 3 through a pair of right and left trailing arms 15 pivotably mounted about pivot points 16, and rear shock absorbers 17 are mounted between the trailing arms 15 and rear end portions of the vehicle body frame 3. The trailing arms 15, together with a power unit 18 provided over the trailing arms 15 and having an electric motor, constitute a swing power unit assembly 14 which can swing vertically.

A control unit 19 is suspended on the rear portion of the vehicle body 5 positioned over the power unit 18.

The control unit 19 is a known control unit constituted, for example, by a microcomputer to control the output of the electric motor of the power unit 18.

A high-voltage power line extends between the control unit 19 and the power unit 18 directly without extending through the interior of the vehicle body 5.

Figure 2:
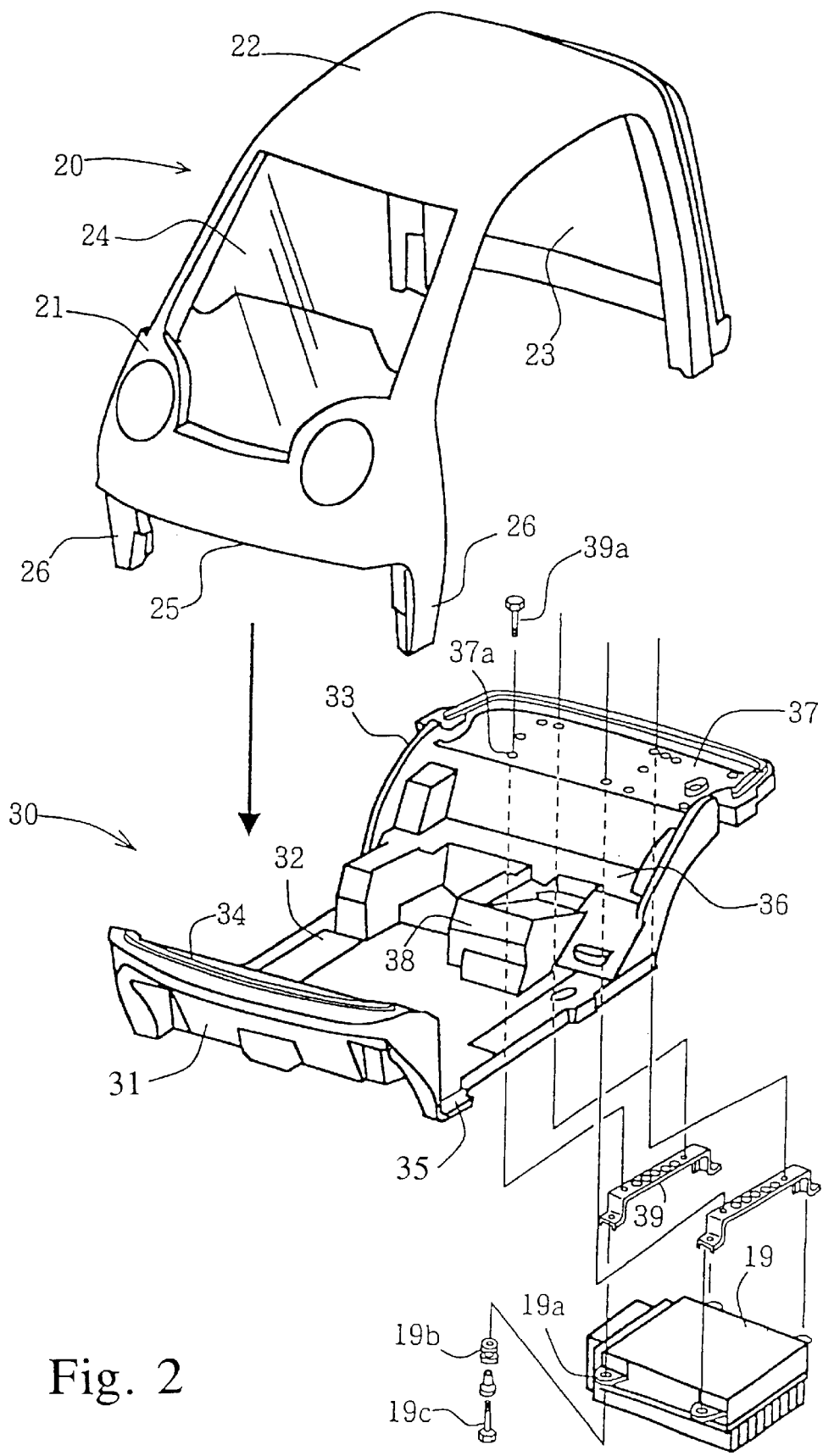
FIG. 2 is an exploded view thereof.

As shown in FIG. 2, the vehicle body 5 is a resinous body including an upper cabin 20 and a lower cabin 30 both combined together vertically.

The upper cabin 20 comprises a front portion 21, a roof portion 22 and a rear portion 23 and is arch-shaped in side view. The roof portion 22 and the rear portion 23 are each formed in a panel shape.

A window 24 with a glass plate fitted therein is formed in the front portion 21. Mounting portions 26 extend downwardly on both the right and left sides of a lower edge 25 of the front portion 21.

The lower cabin 30 comprises a front portion 31, a floor portion 32 and a rearwardly extending portion 33. The front portion 31 rises forwardly and is bonded at its upper edge 34 to the lower edge 25 of the front portion of the upper cabin.

The mounting portions 26 of the upper cabin are abutted and bonded to recesses 35 formed in the floor portion 32 in the vicinity of the base part of the front portion 31.

The rearwardly extending portion 33 includes an inclined portion 36 as a front-half portion rising obliquely backwardly and an overhanging portion 37 extending backwardly and substantially horizontally from the upper end of the inclined portion 36.

The floor portion 32 is placed on and supported by the vehicle body frame 3. The floor portion 32 is integrally formed with a seat mounting portion 38 extending from the rear end of the floor portion 32 up to the inclined portion 36. The seat cushion 6 is mounted to the seat mounting portion 38.

Mounting holes 37a are formed in the overhanging portion 37. Suspending strips 39 are attached to the underside of the overhanging portion 37 with bolts 39a which are inserted into the mounting holes 37a from above.

Mounting holes are formed in both ends of each suspending strip 39. The control unit 19 is mounted to the suspending strips 39 by engagement with mounting lugs 19a formed on side faces of the control unit 19. Bolts 19c are each positioned through a vibration proof rubber member 19b and mounting holes in the mounting lugs 19a.

Figure 3:
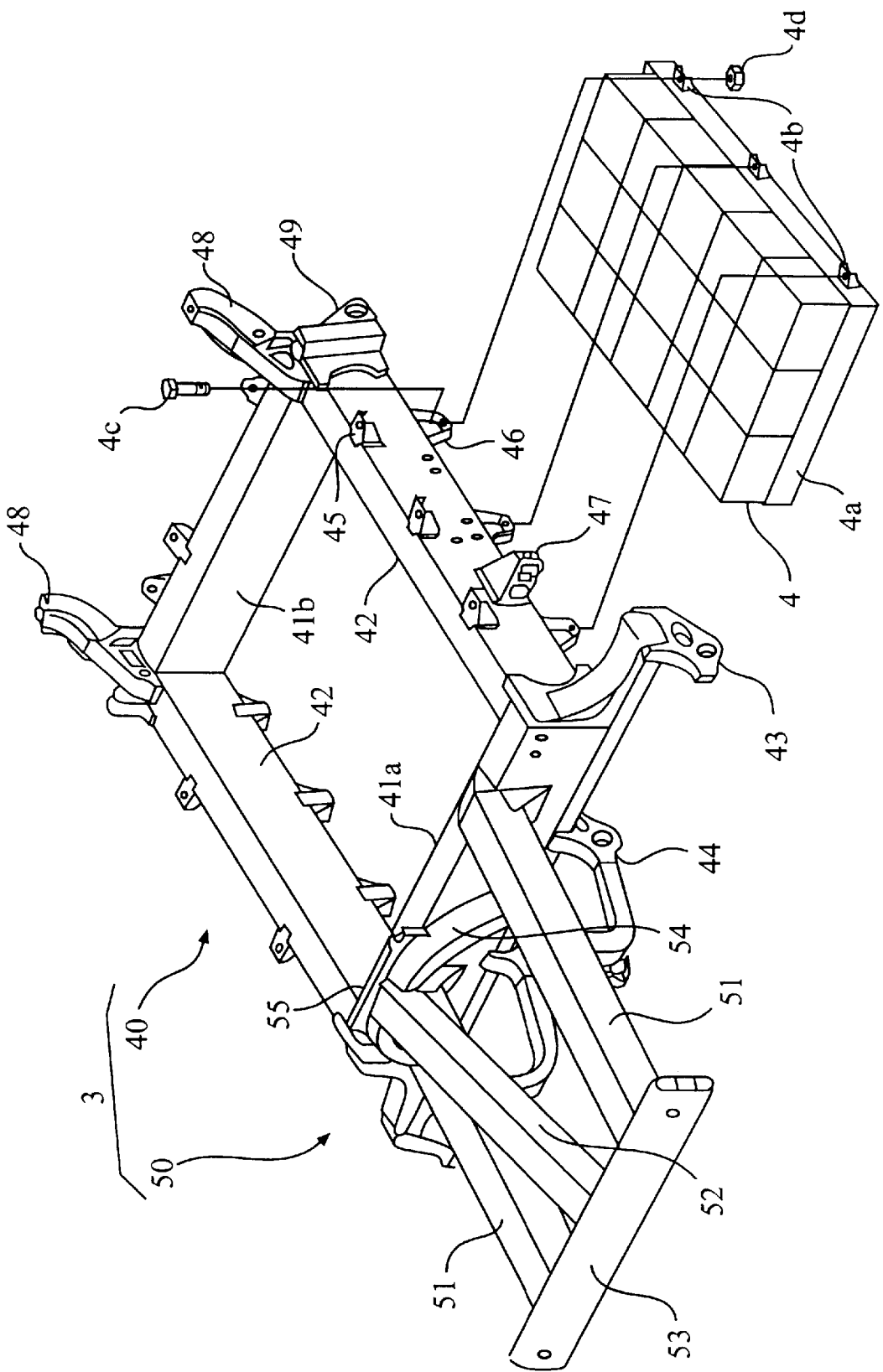
FIG. 3 is a perspective view of the vehicle body portion with a battery pack removed therefrom.

As shown in FIG. 3, the vehicle body frame 3 has a rectangular frame portion 40 formed in a generally quadrilateral shape using a high-rigidity metal such as aluminum (angular pipe) for example and also has a shock absorbing portion 50 formed in front of the rectangular frame portion 40.

The rectangular frame portion 40 is formed substantially in a square-shape comprising front and rear cross members 41a, 41b and right and left side members 42.

Pivot supporting arms 43 projecting obliquely downwardly are provided at both right and left end portions of the cross member 41a. In addition, a pair of pivot supporting arms 44 are provided at the middle portion of the cross member 41a.

The right and left side members 42 are each provided at the upper portion thereof with stays 45 for mounting the lower cabin 30 and at the lower portion thereof with stays 46 for supporting the battery. Further, a shock absorber bracket 47 for supporting the rear end of each front shock absorber 13 is attached to the outer side face of each side member 42 in an intermediate position.

The battery 4 is put on a tray 4a which is received in a rectangular space formed by the rectangular frame portion 40. Mounting lugs 4b project from side faces of the tray 4a, and are superposed on the stays 46 and fixed thereto with bolts 4c and nuts 4d.

Shock absorber brackets 48 backwardly project obliquely upwardly and are provided at both right and left ends of the upper portion of the cross member 41b. Also from both right and left ends of the lower portion of the cross member 41b stays 49 project backwardly and obliquely downwardly.

The shock absorbing portion 50 has a pair of right and left side members 51 extending forward and obliquely upwardly from both end portions of the cross member 41a. A center member 52 is disposed intermediate between and in parallel with the side members 51. The center member 52 extends backwardly and obliquely upwardly.

The front ends of forwardly extending portions of the pivot supporting arms 44 are attached to side faces of intermediate portions of the right and left side members 51.

A bumper 53 is attached to the front ends of the side members 51 and center member 52. The rear end portion of the center member 52 is supported by connecting members 54 extending vertically in a curved direction from the right and left side members 51.

A single, generally semicircular, shock dispersing plate 55 is attached to the connection between the rear end of the center member 52 and the right and left connecting members 54.

Figure 4:
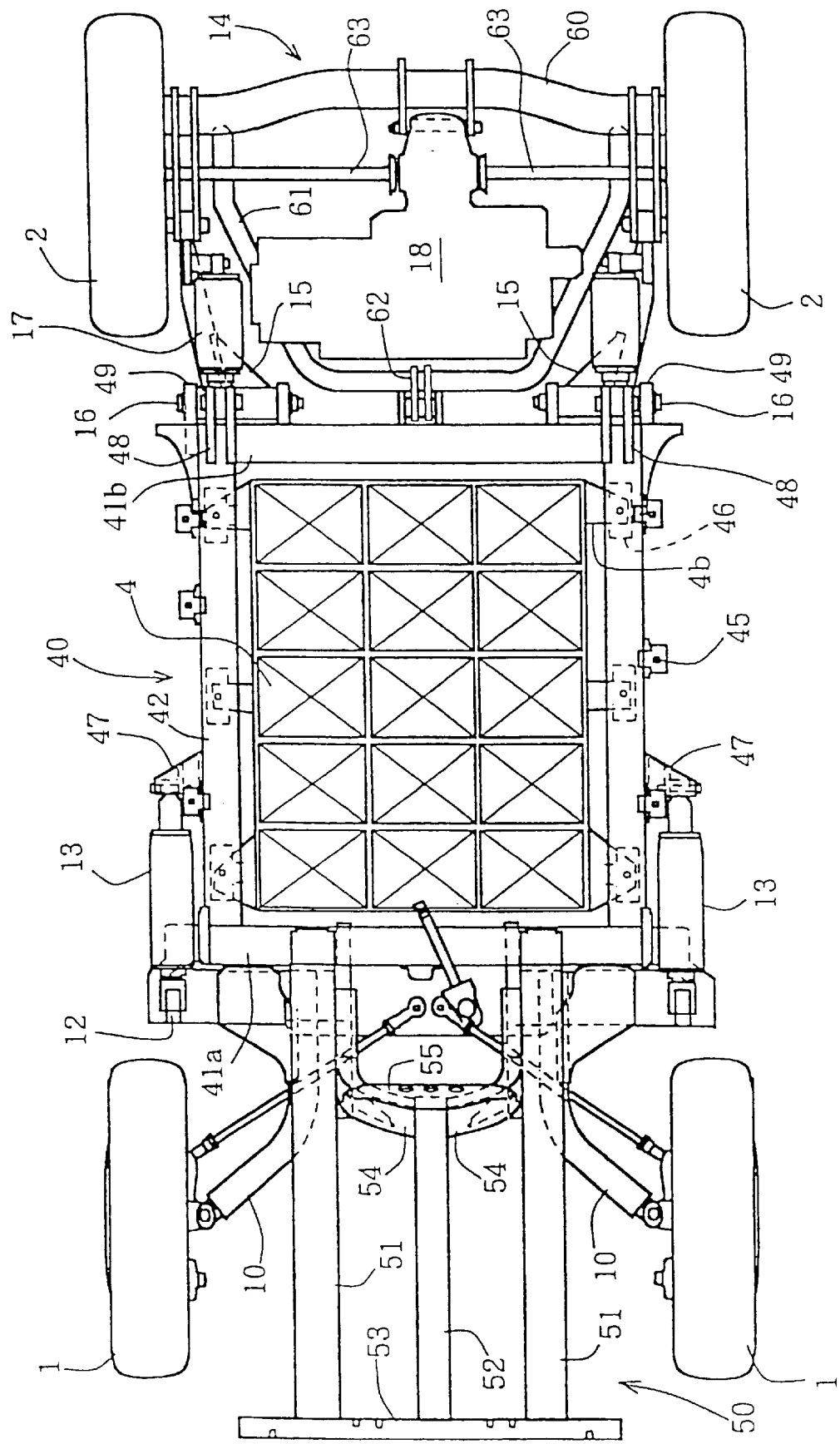
FIG. 4 is a plan view showing a vehicle body frame and front and rear wheel suspension structures.
Figure 5:
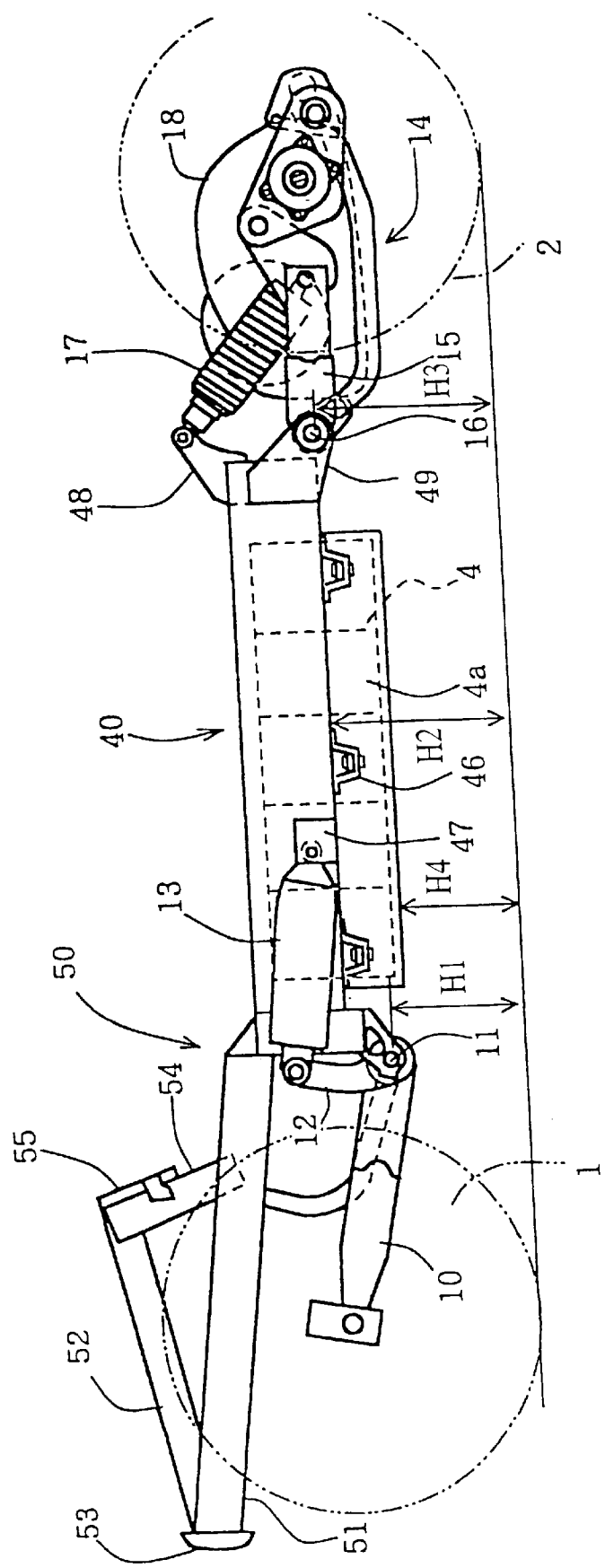
FIG. 5 is a side elevational view thereof.

In connection with a front wheel suspension, as is seen from FIGS. 4 and 5, the rear end portion of each leading arm 10 is pivotally supported between a set of adjacent pivot supporting arms 43 and 44.

In the rear suspension, the front ends of the rear shock absorbers 17 are mounted to the projecting ends of the shock absorber brackets 48 on the cross member 41b and are supported thereby.

Further, the front end portions of the trailing arms 15 are pivotally supported by the lower stays or supporting arms 49, the center of each support portion being the pivot point 16.

The swing power unit assembly 14 is provided with a cross pipe 60 for connection of the rear end portions of the right and left trailing arms 15 and a lower pipe 61 for supporting the bottom of the power unit 18. The front portion of the lower pipe 61 is centrally supported by a link plate 62 coaxially with the pivot points 16 of the cross member 41b.

The right and left rear wheels 2 are rotated through axles 63 which are rotated by the power unit 18.

As illustrated in FIG. 5, the height H1 of the pivot point 11 of each leading arm 10 and the height H3 of the pivot point 16 of each trailing arm 15 are almost equal to the height H2 of the rectangular frame portion 40 which is a main constituent of the vehicle body frame.

Further, the height H1 of the pivot point 11 of each leading arm 10 is also approximately equal to the height H4 of the bottom of the battery tray 4a.

The operation of this embodiment will now be described. In FIG. 5, by making the heights H1 and H3 of the front and rear pivot points 11, 16 almost equal to the height H2 of the rectangular frame portion 40, it becomes possible to lay down the front, leading arms 10, rear trailing arms 15 and front, rear shock absorbers 13, 17.

As a result, the front and rear shock absorbers 13, 17 can be supported inside the front and rear wheels 1, 2, that is, it is not required to extend the rectangular frame portion 40 up to above the front and rear wheels 1, 2. Consequently, it is possible to reduce the size and weight of the rectangular frame portion 40 and hence the whole of the vehicle body frame 3.

Besides, since there no longer are any limitations in layout such as limitations in the amount of the stroke of the front and rear shock absorbers 13,17, shape of the swing power unit assembly 14 and the amount of seat slide, the structure of the vehicle body frame 3 is simplified, thus leading to the reduction of cost.

Further, since the battery 4 can be received in the space defined by the rectangular frame portion 40, the efficiency for accommodating such a heavy object is enhanced. Additionally, since the space is positioned centrally of the vehicle body, it is possible to effect mass concentration. This is suitable for an electric vehicle.

Moreover, by setting the height H1 of the pivot almost equal to the height H4 of the bottom of the battery tray 4a, it becomes possible to protect the battery 4 from obstacles during vehicular running.

Further, since the vehicle body 5 having the rearwardly portion 33 (overhanging portion 37), which overhangs above the swinging power unit assembly 14, fixed by the rectangular frame portion 40, it is possible to maintain a beautiful appearance for the short vehicle body frame 3. Even though the vehicle body is formed of a resin, it is possible to ensure a sufficient space for the passenger compartment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A small-sized vehicle comprising:

a vehicle body frame for supporting a body of the vehicle, said vehicle body frame is formed in a quadrilateral shape by front, rear, right and left members;

first arm members for supporting front wheels adjacent to a front portion of said vehicle body frame, said first arm members extending forwardly from said vehicle body frame;

second arm members for supporting rear wheels adjacent to a rear portion of said vehicle body frame, said second arm members extending rearwardly from said vehicle body frame;

at least one first shock absorber for suspending the first arm members from the vehicle body frame;

at least one second shock absorber for suspending the second arm members from the vehicle body frame;

front supporting arms having pivots for mounting said first arm members to said vehicle body frame, rear supporting arms having pivots for mounting said second arm members to said vehicle body frame, said front and rear supporting arms extending obliquely downwardly from said vehicle body frame, said pivots of said front and rear supporting arms being disposed at a predetermined height being approximately the same height as the height of the vehicle body frame in the vertical direction.

2. The small-sized vehicle according to claim 1, wherein said vehicle is an electric vehicle including a battery for supplying power and being accommodated in a quadrilateral shaped space defined by said vehicle body frame.

3. The small-sized vehicle according to claim 2, wherein the height of the pivots of said front and rear supporting arms and the height of a lower end portion of the battery are approximately the same.

4. The small-sized vehicle according to claim 1, wherein a power unit is disposed on the second arm members, said vehicle body is made of a resin and includes a portion extending above said power unit, and the vehicle body is fixed onto said vehicle body frame.

5. The small-sized vehicle according to claim 1, wherein said at least one first shock absorber includes two shock absorbers for suspending the first arm members from the vehicle body frame, each of said two shock absorbers are connected to a bracket, each said bracket is connected to a side portion of said vehicle body frame and extends laterally from said vehicle body frame.

6. The small-sized vehicle according to claim 1, wherein said at least one second shock absorber includes two shock absorbers for suspending the second arm members from the vehicle body frame, each of said two shock absorbers are connected to a bracket, each said bracket is connected to an upper rear portion of said vehicle body frame and extends obliquely upwardly from said vehicle body frame.

7. The small-sized vehicle according to claim 1, wherein the front supporting arms for said first arm members are mounted adjacent to a front right and a front left portion of said vehicle body frame.

8. The small-sized vehicle according to claim 1, wherein the rear supporting arms for said second arm members are mounted adjacent to a rear right and a rear left portion of said vehicle body frame.

9. The small-sized vehicle according to claim 1, wherein said first arm members include a leading arm portion projecting forwardly and a front arm portion projecting upwardly therefrom, said at least one first shock absorber being connected between said front arm portion and said vehicle body frame.

10. The small-sized vehicle according to claim 1, wherein said second arm members include a trailing arm projecting rearwardly, said at least one second shock absorber being connected between said trailing arm and said vehicle body frame.

11. The small-sized vehicle according to claim 1, wherein said front supporting arms include a first portion extending horizontally laterally from a side of said vehicle body frame and a second portion extending obliquely downwardly from said first portion.

12. The small-sized vehicle according to claim 1, wherein there are four of said front supporting arms and two of said rear supporting arms.

13. The small-sized vehicle according to claim 12, further comprising a shock absorbing portion extending forwardly from a front portion of said vehicle body frame, said shock absorbing portion includes left and right side members extending obliquely upwardly from the front portion of the vehicle body frame, a bumper extending between said left and right side members, and a center member extending obliquely upwardly from said bumper.

14. The small-sized vehicle according to claim 13, wherein a support member is connected between each of the left and right side members and at least one of the front supporting arms.

* * * * *